April 2, 1957  D. B. FUTRELL  2,787,498
REACTION TYPE LAWN SPRINKLER
Filed Aug. 17, 1955
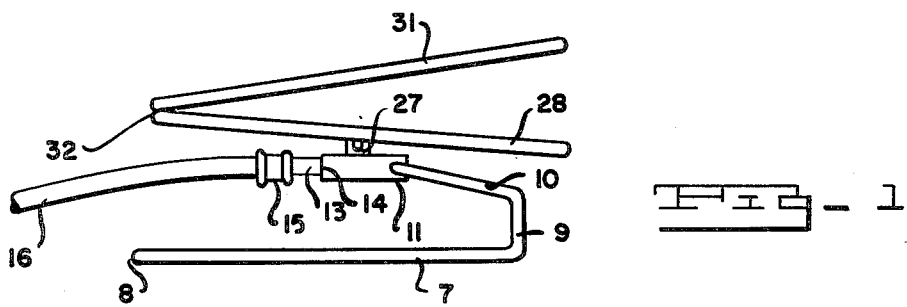
FIG - 1
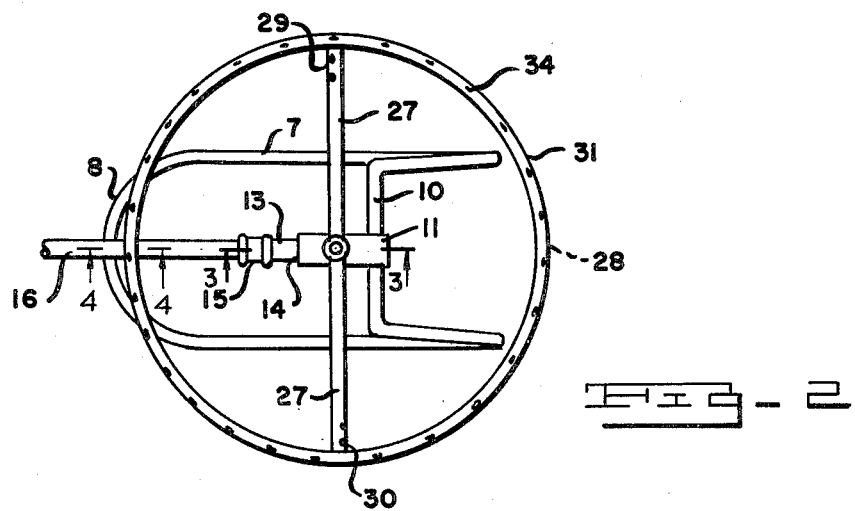
FIG - 2
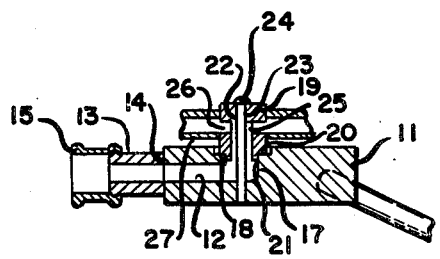
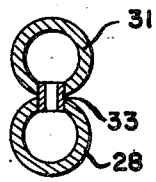
FIG - 4
FIG - 3
INVENTOR.
DENNIE B. FUTRELL
BY
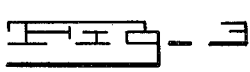
ATTORNEY

2,787,498

REACTION TYPE LAWN SPRINKLER

Dennie B. Futrell, Detroit, Mich.

Application August 17, 1955, Serial No. 528,888

2 Claims. (Cl. 299—69)

This invention relates to a lawn sprinkler and particularly to a lawn sprinkler of the rotating type.

An object of the invention is to provide a water propelled, lawn sprinkler, of the rotary type, which has a distinctive wobble action, which causes the water to be sprinkled with great intensity over a comparatively large area.

Another object of the invention is to provide a lawn sprinkler which, when in action, produces an interesting and spectacular visual effect.

Another object of the invention is to provide a wobble action, rotary type, lawn sprinkler which produces a water pattern, of mysterious character, which attracts attention and creates interest in its operation.

Another object of the invention is to provide a device of the character indicated which is mounted on a sled-like support, whereby it may be pulled from one position to another on the ground while attached to a hose.

Another object of the invention is to provide a device of the character described, which is constructed and arranged so that it may be pulled over rough terrain, without being tipped over, when attached to a garden hose.

Another object of the invention is to provide a rotary type lawn sprinkler, with a wobble action, which is constructed with a novel bearing and distributor hub.

Another object of the invention is to provide a device of the character indicated, which is constructed and arranged with a pair of angularly positioned tubular rings, one of which serves, primarily, in the capacity of a water propulsion element, and the other serves, primarily, in the capacity of a water discharge element.

Another object of the invention is to provide a device of the character indicated, which is constructed and arranged with a pair of tubular rings, which are angularly fixed with respect to each other, and which are rotatable in unison, to effect a wobble action for the discharge of water through the rings.

Another object of the invention is to provide a device of the character indicated, wherein the distributing head may be made of luminescent tubing, whereby the wobble action of the sprinkler may be observed after dark.

The foregoing and other objects and advantages of the invention will become more apparent as the description proceeds, reference being made from time to time to the accompanying drawing forming part of the within disclosure, in which drawing:

Fig. 1 is a side elevational view of a device embodying the invention.

Fig. 2 is a top plan view thereof.

Fig. 3 is a section taken substantially on the line 3—3 of Fig. 2.

Fig. 4 is a section taken substantially on the line 4—4 of Fig. 2.

Referring now more particularly to the drawing, it will be understood that in the embodiment herein disclosed, the reference character 7 indicates in general the base which is preferably made of a single length of tubular stock, which is bent and re-bent to form a curved leading end 8, risers 9, and a U-shaped web portion 10. Secured by welding or other suitable means to the web 10 is a bearing block 11, which is provided with a central bore 12, which communicates with the interior of a hose connector 13, one end of which is secured to the bearing block 11 as at 14, the other end of which is provided with a threaded nut 15, which is adapted to receive a threaded coupling attached to the end of a conventional garden hose 16 (Fig. 1), whereby the device is supplied with water under pressure. The hose 16 also serves as a handle for moving the device from place to place on the ground. The curved end 8 of the base permits it to be dragged over the ground without catching on other objects, and the positioning of the bearing block 11, on the median line and above, and to the rear of the curved end 8, permits the device to be moved from place to place without tipping over, when it is being dragged at the end of the hose 16.

A vertical bore 17 (Fig. 3) is positioned in the bearing block 11 and also communicates with the central bore 12. The bearing block 11 is provided with a flat shoulder 18, which serves as a bearing for a hub element 19, which has an off-set portion 20 which rides on the bearing face 18. The hub 19 has a collar portion 21 which rides on the inside of the bore 17 and holds the hub against lateral displacement as it rotates on the bearing 18, a rod 22 is secured in the bottom of the bearing plate 11 and is provided at its upper end with a threaded bore 23, adapted to receive a machine screw 24 which holds the hub in rotatable position on the bearing 18. The hub 19 has a central bore 25 which communicates with the interior of the bores 12 and 17, so that water may pass through the hub. Water is prevented from leaking around the bearing 18 by means of the collar 21 which is machined to make a close fit in the bore 17. The hub 19 is provided with lateral bores 26, which are in communication with tubular spokes 27, which support the lower tubular ring 28. The interiors of the spokes 27 are in communication with the interior of the tubular ring 28, so that water may enter the tube 28 through the bores 12, 17, 25 and 26. The spokes 27 are provided with discharge holes 29 and 30, which are positioned oppositely on the leading and trailing edges of the spokes 27, to provide jet propulsion for the rotation of the tubular ring 28.

A second tubular ring 31 is positioned above and concentric with the tubular ring 28 and is secured to the ring 28 by welding or the like as at 32. The interior of the ring 31 is in communication with the ring 28 through a short tubular connection 33 (Fig. 4). The tubular ring 31 is provided with a plurality of apertures 34 through which the water is finally discharged. Although I have shown apertures 34 only in the ring 31, it is within the contemplation of the invention to provide apertures in the ring 28 as well.

It will be noted that the tubular ring 28 lies in a plane inclined slightly from the horizontal axis of the base 7 and the bearing block 11. It will be noted also that the tubular ring 31 is inclined from the longitudinal axis of the ring 28, with the result that when the rings 28 and 31 are rotated about the hub 19 as the axis, a wobbling effect is given to the ring action and it appears to an observer that the ring 31 is wobbling on the ring 28. This also develops a very interesting pattern in the water being discharged from the ring 31.

It is also within the contemplation of the invention to form the tubular rings 28 and 31 of a luminescent plastic material, which would make the device visible after dark and would lend interest to its operation.

It is believed that the operation is obvious from the foregoing description.

Having described my invention, what I claim and desire to secure by Letters Patent is:

1. In a device of the character described, in combination, a base, a bearing block rotatably supported by said base, a pair of tubular rings rotatably mounted on said block, and means for introducing water to the interiors of said rings, said rings being in planes which are divergent, one of said rings being supported by a pair of tubular spokes, the interiors of which are in communication with the interiors of said rings and a hollow hub member rotatable on said bearing block, said other ring being secured to a section of one edge of said first mentioned ring by welding, there being water discharge apertures in said spokes and at least one of said rings.

2. In a device of the character described, in combination, a base, a bearing block rotatably supported by said base, a pair of tubular rings rotatably mounted on said block, and means for introducing water to the interiors of said rings, said rings being in planes which are divergent, one of said rings being supported by a pair of tubular spokes, the interiors of which are in communication with the interiors of said rings and a hollow hub member rotatable on said bearing block, said other ring being secured to said first mentioned ring along a portion of one side, there being a bearing surface on said hub in contact with a bearing surface on said block, and there being a depending collar on said hub received in a bore in said block, whereby to seal said bearing contact.

References Cited in the file of this patent

UNITED STATES PATENTS

| | | |
|---|---|---|
| 462,902 | Jones | Nov. 10, 1891 |
| 709,907 | Huebner | Sept. 30, 1902 |
| 1,790,732 | Tichava | Feb. 3, 1931 |
| 2,202,349 | Lewis | May 28, 1940 |
| 2,670,992 | Long | Mar. 2, 1954 |

FOREIGN PATENTS

| | | |
|---|---|---|
| 170,242 | Germany | of 1906 |
| 193,912 | Germany | Jan. 6, 1908 |
| 426,223 | France | May 14, 1912 |
| 91,693 | Argentina | Oct. 1, 1954 |